US010940832B1

(12) United States Patent
Hardenia

(10) Patent No.: US 10,940,832 B1
(45) Date of Patent: Mar. 9, 2021

(54) IDENTIFYING SUSPICIOUS EVENTS RELATING TO A VEHICLE

(71) Applicant: Toyota Motor North America, Inc., Plano, TX (US)

(72) Inventor: Dharmendra M. Hardenia, Plano, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/574,744

(22) Filed: Sep. 18, 2019

(51) Int. Cl.
*B60R 25/102* (2013.01)
*B60R 25/32* (2013.01)
*B60R 25/30* (2013.01)
*B60R 25/10* (2013.01)

(52) U.S. Cl.
CPC .......... *B60R 25/302* (2013.01); *B60R 25/102* (2013.01); *B60R 25/32* (2013.01); *B60R 2025/1016* (2013.01)

(58) Field of Classification Search
CPC ... G06F 21/554; G06F 21/55; H04L 63/1425; H04L 63/1416; H04L 63/1433; B60R 25/302; B60R 25/32; B60R 25/102; B60R 2025/1016
See application file for complete search history.

(56) References Cited

U.S. PATENT DOCUMENTS

| | | | |
|---|---|---|---|
| 6,791,456 B2 | 9/2004 | Nakayama et al. | |
| 8,862,384 B2 | 10/2014 | Stahlin et al. | |
| 8,989,954 B1* | 3/2015 | Addepalli | H04W 48/02 701/32.3 |
| 9,457,689 B2 | 10/2016 | Stefan et al. | |
| 9,778,054 B2 | 10/2017 | Rovik et al. | |
| 9,809,184 B2 | 11/2017 | Smith et al. | |
| 10,006,778 B2 | 6/2018 | Perkins et al. | |
| 10,008,102 B1 | 6/2018 | McEachron | |
| 10,117,096 B2 | 10/2018 | De Lorenzo et al. | |
| 10,123,199 B2 | 11/2018 | Truong et al. | |
| 10,242,513 B1 | 3/2019 | Fields et al. | |
| 10,282,981 B1 | 5/2019 | Nepomuceno et al. | |
| 2004/0257208 A1 | 12/2004 | Huang et al. | |
| 2004/0263323 A1* | 12/2004 | Seike | B60R 25/104 340/426.1 |
| 2007/0156317 A1* | 7/2007 | Breed | B60R 21/01516 701/45 |
| 2008/0001739 A1* | 1/2008 | Faoro | B60R 25/04 340/568.1 |

(Continued)

*Primary Examiner* — Brian E Miller
(74) *Attorney, Agent, or Firm* — Snell & Wilmer LLP

(57) ABSTRACT

A system for monitoring suspicious activity of a vehicle includes a memory designed to store pattern data corresponding to a historical pattern of behavior of the vehicle. The system further includes a sensor designed to detect sensor data corresponding to a current vehicle behavior. The system further includes a network access device designed to communicate with a remote device. The system further includes an electronic control unit (ECU) coupled to the memory, the sensor, and the network access device. The ECU is designed to determine a suspicious event when the current vehicle behavior deviates from the historical pattern of behavior of the vehicle by a threshold amount. The ECU is further designed to control the network access device to transmit a notification of the suspicious event to the remote device.

18 Claims, 5 Drawing Sheets

(56) References Cited

U.S. PATENT DOCUMENTS

| | | | |
|---|---|---|---|
| 2008/0121684 A1* | 5/2008 | Gualandri | G06Q 10/06 235/375 |
| 2012/0089299 A1* | 4/2012 | Breed | B60N 2/888 701/36 |
| 2014/0310186 A1* | 10/2014 | Ricci | G08B 13/19647 705/302 |
| 2017/0316533 A1 | 11/2017 | Goldman-Shenhar et al. | |
| 2018/0322413 A1 | 11/2018 | Yocam et al. | |
| 2018/0342113 A1* | 11/2018 | Kislovskiy | G08G 1/202 |
| 2019/0092337 A1 | 3/2019 | Chua et al. | |
| 2019/0279447 A1* | 9/2019 | Ricci | B60R 25/25 |
| 2020/0005644 A1* | 1/2020 | Ichimaru | G08G 1/164 |
| 2020/0160633 A1* | 5/2020 | Zhang | B60R 25/102 |
| 2020/0198651 A1* | 6/2020 | Levy | G06N 20/00 |
| 2020/0216079 A1* | 7/2020 | Mahajan | B60W 50/16 |

\* cited by examiner

IDENTIFYING SUSPICIOUS EVENTS RELATING TO A VEHICLE

BACKGROUND

1. Field

The present disclosure relates to systems and methods for identifying suspicious events relating to a vehicle and for taking an action in response to identifying such suspicious events.

2. Description of the Related Art

Technology, including electronics installed in vehicles, is increasing in speed and accuracy, and simultaneously decreasing in cost. As a result, vehicles now include more and higher-quality electronics (such as sensors, electronic control units (ECUs), memories, and network access devices) than ever before. Recently, software has been growing in both functionality and efficiency at an exponential rate, thus providing new and improved uses for the improved hardware. Automobile manufacturers are thus able to write software code for vehicles to perform many operations beyond basic vehicle controls. Due to the increased quantity and quality of electronics in vehicles, automobile manufacturers are developing new systems and methods for performing various tasks which may relate directly, indirectly, or not at all to the act of driving the vehicle along a route.

Although some vehicles include anti-theft features, such systems are currently rudimentary at best and do not take advantage of the improved vehicle electronics. For example, some vehicular alarm systems may sound a siren if the vehicle is broken into, but an intelligent criminal may be capable of re-wiring the vehicle, or taking other measures, to prevent such alarms. In addition, if a criminal steals a car key to enter and drive a vehicle, there are no systems to identify this theft. Other undesirable situations which vehicles are incapable of determining may include harm to a driver or a passenger, a driver inadvertently leaving the vehicle in a parking lot past an allotted amount of time, or the like.

Thus, there is a need in the art for systems and methods for identifying suspicious events relating to a vehicle and taking an action in response to such events.

SUMMARY

Described herein is a system for monitoring suspicious activity of a vehicle. The system includes a memory designed to store pattern data corresponding to a historical pattern of behavior of the vehicle. The system further includes a sensor designed to detect sensor data corresponding to a current vehicle behavior. The system further includes a network access device designed to communicate with a remote device. The system further includes an electronic control unit (ECU) coupled to the memory, the sensor, and the network access device. The ECU is designed to determine a suspicious event when the current vehicle behavior deviates from the historical pattern of behavior of the vehicle by a threshold amount. The ECU is further designed to control the network access device to transmit a notification of the suspicious event to the remote device.

Also disclosed is a system for monitoring suspicious activity of a vehicle. The system includes a memory designed to store pattern data corresponding to a historical pattern of behavior of the vehicle. The system further includes a sensor designed to detect sensor data corresponding to a current vehicle behavior. The system further includes a network access device designed to communicate with a remote device. The system further includes an electronic control unit (ECU) coupled to the memory, the sensor, and the network access device. The ECU is designed to generate the pattern data based on the detected sensor data over a period of time. The ECU is further designed to determine a suspicious event when the current vehicle behavior deviates from the historical pattern of behavior of the vehicle by a threshold amount. The ECU is further designed to control the network access device to transmit a notification of the suspicious event to the remote device.

Also disclosed is a method for monitoring suspicious activity of a vehicle. The method includes storing, in a memory, pattern data corresponding to a historical pattern of behavior of the vehicle. The method further includes detecting, by a sensor, sensor data corresponding to a current vehicle behavior. The method further includes determining, by an electronic control unit (ECU), a suspicious event when the current vehicle behavior deviates from the historical pattern of behavior of the vehicle by a threshold amount. The method further includes controlling, by the ECU, a network access device to transmit a notification of the suspicious event to the remote device.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for identifying suspicious events relating to a vehicle or a vehicle owner, and for taking actions in response to identifying such events. The systems provide several benefits and advantages such as identifying a variety of suspicious and undesirable events such as vehicle theft, injury or harm to a vehicle user (e.g., identifying when a driver has a stroke or becomes unconscious), the vehicle remaining in a parking spot for a period of time approaching a maximum amount of time, or the like. The systems advantageously take actions if such events are determined; for example, the system can notify an owner or authorities if the vehicle is stolen, can notify a family member if a vehicle operator becomes unconscious, or the like. These actions provide multiple benefits such as providing help to an injured driver quickly, thus reducing any long-term harm to the driver; increasing the likelihood of a driver recovering a stolen vehicle; and reducing the likelihood of the driver receiving a parking ticket. The systems further advantageously confirm or deny the suspicious event by comparing sensor data and other vehicle data to baseline data, and can further confirm or deny the events by reviewing a calendar associated with a vehicle owner or an operator.

An exemplary system includes one or more sensor located on the vehicle that can detect sensor data. The system further includes a network access device that can communicate with a remote device, such as that of a vehicle owner or authorities. The system also includes a memory that can store data. The system further includes an electronic control unit. The electronic control unit can monitor the sensor data and determine a driving pattern that corresponds to driving and other vehicle-related habits of a vehicle driver. The ECU can control the memory to store the driving pattern in the memory as pattern data. After generating and storing the pattern data, the ECU can compare the sensor data to the pattern data, and determine that a suspicious event has occurred when the sensor data deviates from the pattern data by a predetermined amount. In response to identifying a suspicious event, the ECU can control the network access device to notify the remote device of such event, or can take other actions such as maneuvering the vehicle to a new location.

Figure 1:
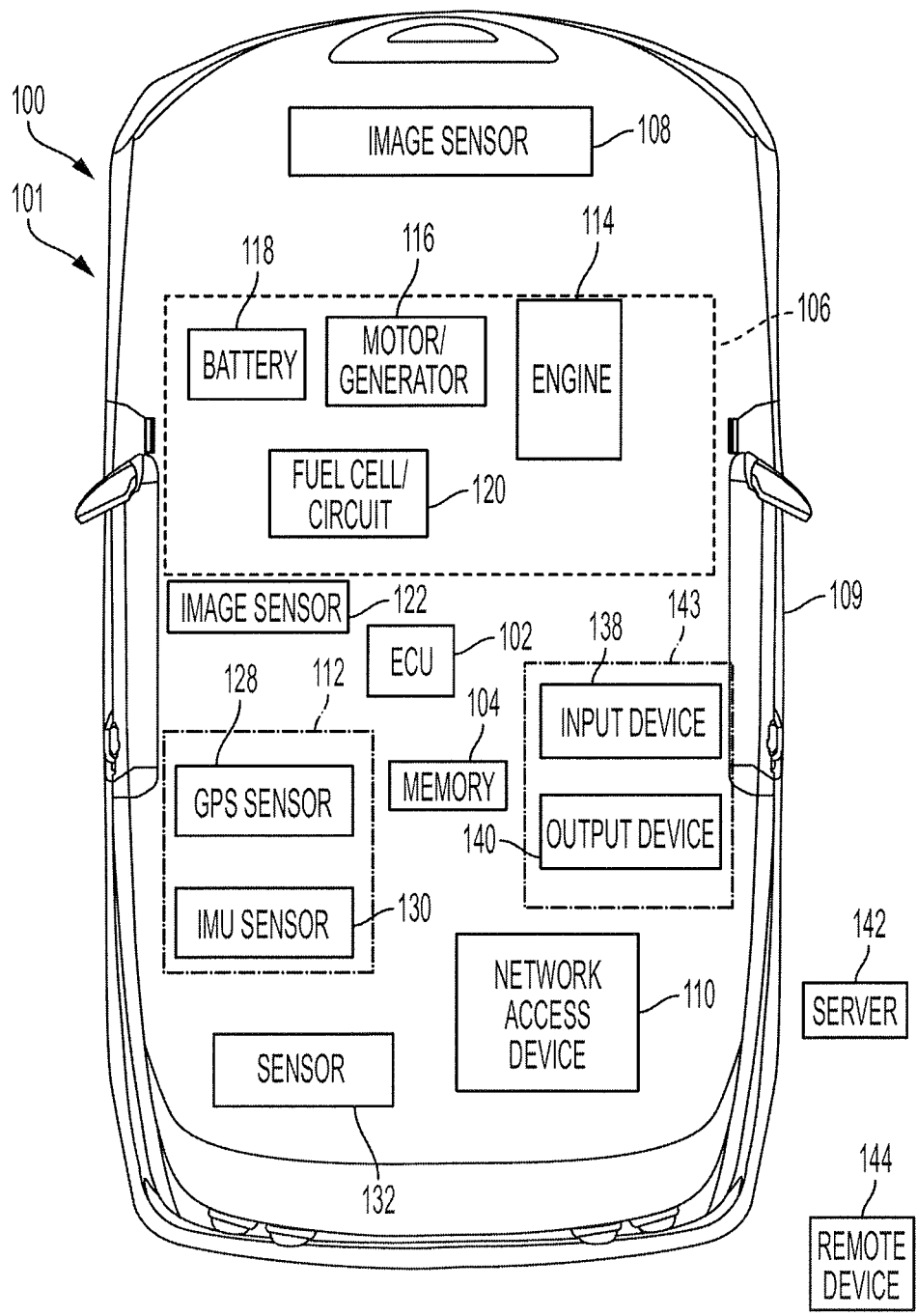
FIG. 1 is a block diagram illustrating a system and a vehicle for identifying a suspicious event and taking an action in response to identifying such events according to an embodiment of the present invention.

Turning to FIG. 1, a vehicle 100 may include a system 101 for identifying a suspicious activity in or around the vehicle 100. The vehicle 100 (or system 101) may include an ECU 102, a memory 104, a power source 106, and a main body 109. The vehicle 100 (or system 101) may further include a network access device 110, an image sensor 108, and a sensor 132. The vehicle 100 may also include a multimedia unit 143 including an input device 138 and an output device 140.

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individual such as a driver, a passenger, or the like. The main body 109 may define a vehicle cabin (not shown). An image sensor 122 may be located in, or directed into, the vehicle cabin and may detect image data corresponding to the vehicle cabin. For example, the image sensor 122 may be directed to one or more passengers inside and/or outside the vehicle 100.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100 or without a person in the driver's seat or driving the vehicle 100. The ECU 102 may facilitate such autonomous functionality.

The memory 104 may include any non-transitory memory and may store data usable by the ECU 102. For example, the memory 104 may store map data, may store instructions usable by the ECU 102 to drive autonomously, may store pattern data corresponding to a detected pattern of operation of the vehicle, or the like.

The power source 106 may include any one or more of an engine 114, a motor-generator 116, a battery 118, or a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116 or other electrical components of the vehicle 100. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from the wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 108 may be coupled to the main body 108 and may detect image data corresponding to an environment of the vehicle 100. For example, the image sensor 108 may include a camera, a radar detector, a lidar detector, or any other image sensor capable of detecting light having any wavelength. The image sensor 122 may likewise include a camera, a radar detector, a lidar detector, or any other sensor capable of detecting light having any wavelength. The image sensor 122 may be positioned or oriented to detect image data inside the vehicle cabin.

The sensor 132 may include one or more of a sensor capable of detecting a status of a vehicle component, a sensor capable of detecting environmental conditions (including weather), a voltage sensor, a current sensor, a temperature sensor, a pressure sensor, a fuel gauge, an airflow sensor, or an oxygen sensor. The sensor 132 may also or instead include a motion sensor to detect movement of the vehicle 100; an acceleration sensor to detect at least one of an acceleration, a deceleration, an acceleration request, or a deceleration request of the vehicle 100; a braking sensor to detect at least one of a braking event or a braking request of the vehicle 100; and/or a turn sensor to detect at least one of a turn or a turn request of the vehicle 100. The sensor 132 may also or instead include a passenger sensor to detect at least one of a presence of passengers or an identity of the passengers in the vehicle cabin; a shift sensor to detect gear shifting of the vehicle 100; a blinker to detect a turn indicator request of the vehicle 100; a power source sensor to detect a state of a power source of the vehicle 100; or the like.

The input device 138 may include any one or more input device such as a button, a keyboard, a mouse, a touchscreen, a microphone, or the like. The input device 138 may receive input from a user of the vehicle 100 such as a driver or a passenger. In some embodiments, the network access device 110 may be considered an input device as it may receive input from a remote device 144 associated with a vehicle user.

The output device 140 may include any output device such as a speaker, a display, a touchscreen, or the like. The output device 140 may output data to a user of the vehicle such as a warning of a suspicious event. The network access device 110 may likewise be considered an output device as it may transmit output data to the remote device 144, where it may be output to a vehicle user.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wired or wireless protocol. The network access device 110 may be referred to as a data communication module (DCM) and may communicate with any device on the vehicle 100 and/or any remote device. For example, the network access device 110 may communicate with at least one of a remote server 142 (such as a cloud server or other central server) or a remote device 144 (such as a mobile telephone, a laptop, a tablet, a desktop computer, a PDA, or the like).

At least one of the ECU 102 or the remote server 142 may receive sensor data (which may also or instead be referred to as vehicle control data, as it may relate to control of the vehicle) from any one or more sensor or other device of the vehicle 100 (such as the image sensor 108, the image sensor 122, the location sensor 112, the sensor 132, a gear shifter, a turn signal indicator, a steering wheel, or the like). In some embodiments, one or both of the ECU 102 or the remote server 142 may determine pattern data corresponding to a pattern of operation of the vehicle 100 based on the sensor data. The pattern data may include, for example, a driving style of the vehicle (e.g., a level of aggression), a schedule of vehicle trips, a quantity of vehicle passengers, or the like.

After determining the pattern data, the remote server 142 (or ECU 102) may continue receiving the sensor data and may compare newly-received or detected sensor data to the pattern data to determine a deviation from the determined pattern of vehicle operation. If a deviation is greater than a threshold deviation then the remote server 142 (or ECU 102) may determine that a suspicious event has occurred and may take an action. The action may include, for example, notifying a remote device 144 associated with a user of the vehicle 100, preventing further operation of the vehicle 100 until a user can be authenticated, or the like. The threshold deviation may be an amount of deviation beyond which it is determined that a suspicious event relating to the vehicle 100 has occurred (such as a vehicle theft or an injury to a driver or a passenger).

A suspicious event may be defined as any event or action, or lack thereof, that indicates harm or threat of harm to a vehicle owner or user; indicates damage, theft, or threat thereof to the vehicle 100; or indicates any other undesirable situation relating to the vehicle 100.

Figure 2:
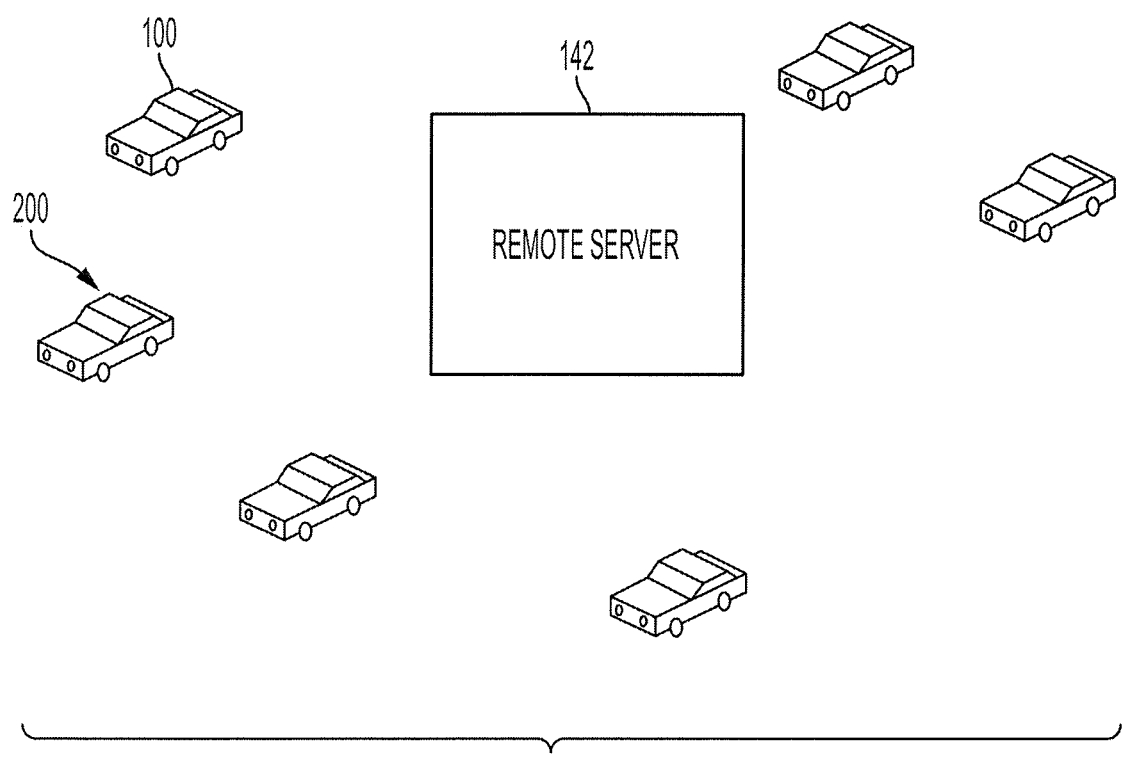
FIG. 2 is a block diagram illustrating a system for identifying a suspicious event relating to vehicles and taking an action in response to identifying such events according to an embodiment of the present invention.

Referring now to FIG. 2, the remote server 142 may communicate with multiple vehicles 200 including the vehicle 100. The remote server 142 may receive sensor data from some or all of the vehicles 200. The remote server 142 may aggregate the sensor data, or aggregate an analysis of all of the sensor data, to identify pattern data for each of the vehicles 200. The remote server 142 may further use machine learning or another optimization algorithm to learn trends of the sensor data, and use the trends to optimize pattern recognition algorithms. In some embodiments, the ECUs of the vehicles 200 may determine or identify the patterns for the respective vehicles 200. The remote server 142 may receive the learned patterns and may update or improve the patterns (or pattern learning algorithms) based on learned trends. In embodiments in which the remote server 142 learns the patterns, the remote server 142 may transmit the learned patterns to the respective vehicles 200, or may compare newly-detected sensor data to the learned patterns to determine the presence of, and identification of, suspicious events.

Figure 3:
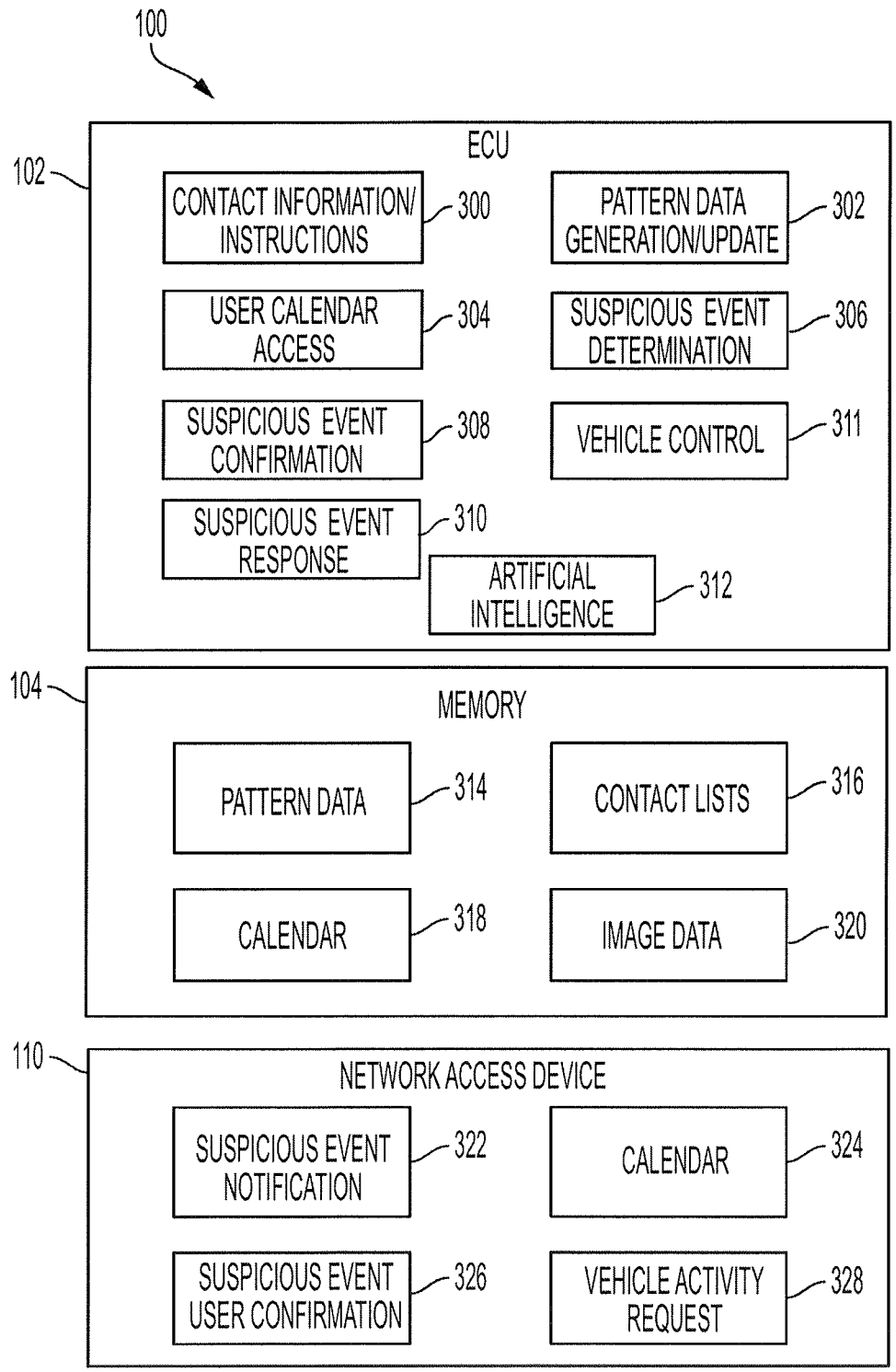
FIG. 3 is a block diagram illustrating additional features of the vehicle of FIG. 2 according to an embodiment of the present invention.

Referring now to FIG. 3, additional details of the vehicle 100 are shown. In particular, FIG. 3 illustrates additional features of the ECU 102, the memory 104, and the network access device 110. In some embodiments, the features of the ECU 102, the memory 104, and the network access device 110 may also or instead be performed by corresponding components (e.g., a processor, a memory, and a network access device) of the remote server 142 of FIG. 1. In addition, one skilled in the art will realize that components of a vehicle may perform some, all, or none of the features illustrated in FIG. 3, and that a vehicle according to the present disclosure may likewise perform additional features not illustrated in FIG. 3.

The ECU 102 may be designed to perform various functions or algorithms. For example, the ECU 102 may be designed to perform a contact information instruction determination algorithm 300. The algorithm 300 may determine or otherwise learn instructions, such as phone numbers or IP addresses, that the ECU 102 or the network access device 110 may utilize in order to contact the remote device 144 of FIG. 1. The contact information instruction algorithm 300 may further include information such as an identity of various remote devices to contact based on the type of suspicious event that is determined. For example, the algorithm 300 may indicate to contact police (and may include a contact number) if the suspicious event includes a potential theft of the vehicle 100, may indicate to contact a family member of a vehicle operator (and may include a contact number) if the suspicious event includes an illness of the vehicle operator, or the like.

The ECU 102 may further perform a pattern data generation or update algorithm 302. The algorithm 302 may be used by the ECU 102 to learn or determine patterns of vehicle operation based on detected vehicle data. For example, the algorithm 302 may receive, store, and analyze sensor data from various sensors of the vehicle 100. The sensor data may include image data, location data, acceleration data (including acceleration or braking requests of the vehicle 100), steering data (corresponding to steering of the vehicle 100), passenger data (corresponding to at least one of a quantity of or identity of vehicle passengers), or the like. After storing the sensor data over a period of time, the algorithm 302 may determine trends in the vehicle operation and may store the trends as pattern data (e.g., pattern data 314 in the memory 104).

After the pattern data has been generated, the algorithm 302 may be used to update the pattern data based on newly received sensor data. For example, if the trends of vehicle operation have changed since the generation of the pattern data, the algorithm 302 may update the pattern data to account for the new trends. The algorithm 302 may continuously, periodically, or from time to time update the pattern data based on newly received sensor data. The ECU 102 may be capable of distinguishing changes in pattern data from suspicious events, as further described below.

In some embodiments, a user of the vehicle 100 may request to reset the pattern data (e.g., if ownership of the vehicle 100 is transferred), may request to extend a learning time for the pattern data (e.g., if the vehicle 100 has been used in a non-routine manner), or the like. In response to receiving a reset request, the algorithm 302 may reset the pattern data, wiping out the previously stored pattern data and beginning generation of the pattern data from scratch. However, the ECU 102 may require verification that the individual requesting to reset the pattern data is authorized to make such request before any reset is complete. In response to receiving an extension request, the algorithm 302 may increase a period of time for which the sensor data will be used to generate the pattern data. In some embodiments, the user may indicate a total amount of time for the pattern data generation or an amount of time by which the pattern data generation should be extended, and the algorithm 302 may accommodate such request.

The ECU 102 may further perform a user calendar access algorithm 304. The ECU 102 may use the algorithm 304 to identify and access a user calendar located on a user device and/or located on the cloud. For example, the algorithm 304 may include an identifier of a user device (such as a smart phone) on which the user calendar may be stored, and the ECU 102 may use this information to access the user calendar. As another example, the algorithm 304 may include a user ID of a user along with a platform (e.g., Google calendar) on which the user calendar is available, and the ECU 102 may use this information to access the user calendar on the platform. As will be described further below, the ECU 102 may utilize the calendar data to determine whether certain vehicle activities are expected or whether such activities indicate a suspicious event.

The ECU 102 may also perform a suspicious event determination algorithm 306. The algorithm 306 may compare the sensor data or other data corresponding to operation or control of the vehicle 100 to the pattern data in order to determine whether a deviation from the determined pattern has occurred. For example, the pattern data may indicate that the vehicle 102 is always driven before 10 AM on weekdays. If the vehicle 100 remains parked past 10 AM on a weekday then the algorithm 306 may determine that a deviation has occurred. However, presence of a deviation from a typical pattern may not amount to a suspicious event. Rather, a deviation that is greater than a threshold deviation may indicate the presence of a suspicious event. The threshold deviation may be a deviation amount beyond which the ECU 102 may determine that a suspicious event is likely. Continuing the above example, the ECU 102 may determine that no deviation occurred if the user starts the car at 10:15 AM, but may determine that a deviation has occurred if the user still has not arrived by 11 AM.

The ECU 102 may be programmed with certain deviation characteristics which meet or exceed the threshold deviation, may learn which deviations meet or exceed the threshold deviation, or the like. In some embodiments, the remote server 142 of FIG. 1 may instruct or guide the ECU 102 (e.g., by providing an algorithm or other data) as to which deviations meet or exceed the threshold deviation. For example, the remote server 142 may transmit a list of deviations, or a description of deviations, which meet or exceed the threshold deviation.

In some embodiments, multiple different types of deviations must be determined in order to meet or exceed the threshold deviation. For example, if the vehicle is being driven in a different manner than determined previously as part of the pattern data (e.g., quicker acceleration or harder steering) then the ECU 102 may determine that this activity amounts to a deviation. A suspicious event may be that the vehicle 100 is stolen. However, before determining that a suspicious event has occurred, the ECU 102 may analyze image data from an interior of the vehicle cabin. If the image data indicates that the driver and all passengers are previously known then the ECU 102 may determine that the deviation in driving style does not amount to a suspicious event. In some embodiments, this situation may correspond to a suspicious event, but the ECU 102 may identify a different type of suspicious event (e.g., the suspicious event may be that the driver is intoxicated or high rather than a vehicle theft or the driver or a passenger is sleeping or passed out in the vehicle).

The ECU 102 may further perform a suspicious event confirmation algorithm 308. The algorithm 308 may be used to confirm or deny the presence of a suspicious event, or may be used to identify or verify a specific type of suspicious event. For example, the algorithm 308 may utilize the image data comparison described above as a suspicious event confirmation. As another example, the ECU 102 may identify a deviation that the vehicle has not been driven for three days. Rather than immediately determining a suspicious event (indicating, for example, that harm has befallen the vehicle owner), the ECU 102 may utilize the algorithm 304 to access a user calendar. If the user calendar indicates that the user will be on a trip during the three-day absence, then the ECU 102 may determine that no suspicious event has occurred. However, if no trip is indicated on the calendar, then the ECU 102 may determine that a suspicious event has occurred.

The ECU 102 may also perform a suspicious event response algorithm 310. The algorithm 310 may be used to identify what action, if any, the ECU will take in response to determining a suspicious event. The response may include, for example, contacting a remote device associated with the user or an associate of the user, contacting a remote device associated with authorities, controlling the vehicle 100 to perform any of multiple actions (such as powering-up a power source or moving the vehicle), initiating a vehicle alarm, or the like.

The ECU 102 may be programmed by a manufacturer of the vehicle 100 to take certain actions in response to identifying specific suspicious events, may be instructed by a user of the vehicle 100 of which actions to take in response to identifying specific suspicious events, may learn based on experience (or information provided by the remote server 142 of FIG. 1), or some combination thereof. For example, the vehicle manufacturer may indicate that the ECU 102 is to contact authorities if a suspicious event occurs that includes the vehicle 100 being stolen. As another example, a vehicle user may indicate that the ECU 102 is to contact the wife of the vehicle user if a suspicious event occurs that includes the user becoming ill or otherwise incapacitated. As yet another example, the vehicle user may indicate that the ECU 102 is to control the vehicle 100 to move to a different parking lot if the suspicious event includes the vehicle 100 approaching the end of a maximum parked time at a given parking lot (e.g., parked for 23 hours in a parking lot with a maximum parking time of 24 hours).

The ECU 102 may further perform a vehicle control algorithm 311. The vehicle control algorithm 311 may be used by the ECU 102 to control various aspects of vehicle control such as control of the power source, control of vehicle steering, control of various vehicle accessories (such as an audio system or a climate control system), or the like. Continuing the example of the maximum parked time at a given parking lot, the ECU 102 may learn that the given parking lot has a maximum parked time of 24 hours. After being parked in the parking lot for 23 hours, the ECU 102 may determine that a suspicious event of the vehicle 100 potentially overstaying the maximum parking time has occurred. The ECU 102 may take a specific action such as reaching out to the user to indicate that the user should move the vehicle 100. However, if no response is received from the user (and the user has not returned to the vehicle 100) after an additional 30 minutes then the ECU 102 (using the algorithm 311) may control the vehicle 100 to move to a different parking lot to avoid any fine or penalty.

The algorithm 311 may further initiate any communications that were determined to be taken in the algorithm 310. For example, if the algorithm 310 determined that the vehicle 100 should contact authorities, then the algorithm 311 may prepare a communication (such as voice or text) and may control the network access device 110 to transmit the communication.

The ECU 102 may further perform an artificial intelligence algorithm 312. The artificial intelligence algorithm 312 may be included as part of, or may assist with, any of the other algorithms performed by the ECU 102. The artificial intelligence algorithm 312 may also or instead be used to improve operation of any other algorithms performed by the ECU 102. For example, the algorithm 312 may improve the operation of the suspicious event determination algorithm 306 in order to improve the accuracy of determining suspicious events. The algorithm 312 may be trained based on at least one of past or present data, including results of any one or more algorithms.

The memory 104 may store any of a variety of data usable by any algorithm of the ECU 102, and may further include instructions for performing any algorithm of the ECU 102. Any of the information stored in the memory 104 may also or instead be stored in the server 142 of FIG. 1. For example, all information may be stored in the memory 104, all information may be stored in the remote server 142, or some information may be stored in the memory 104 and other information may be stored in the remote server 142.

In particular, the memory 104 may store pattern data 314. The pattern data 314 may include the pattern data determined by the ECU in the pattern data generation and update algorithm 302. The pattern data 314 may further be updated by the pattern data generation and update algorithm 302. The ECU 102 may continuously, periodically, or from time to time update the pattern data 314 with presently detected data, previously detected data, or both.

The memory 104 may further store a contact list 316. The contact list 316 may include an identifier of one or more individual to be contacted when a suspicious event is determined to have occurred along with information usable to facilitate such communication. The contact list may further include a description of when each individual or entity should be contacted. For example, the contact list may include an identifier of a vehicle owner, a phone number for the vehicle owner, and a description that the vehicle owner should be contacted if a suspicious event includes a theft of the vehicle 100. The contact list may further include an identifier of a hospital, a phone number for the hospital, and a description that the hospital should be contacted if the suspicious event includes harm to the vehicle owner.

In some embodiments, the memory 104 may further store one or more calendar 318 associated with the vehicle user. The calendar 318 may be retrieved from the cloud or from a user device (such as the remote device 144 of FIG. 1) and may include scheduled appointments of the vehicle user. In some embodiments, the calendar 318 may be periodically, continuously, or from time to time synced with the cloud or the user device. The ECU 102 may access the calendar 318 in order to determine any suspicious event or to confirm a suspicious event.

The memory 104 may also store image data or other data 320. The image data or other data 320 may include data that the ECU 102 may compare detected data to in order to determine if a suspicious event has occurred or to confirm the suspicious event. For example, the image data 320 may include one or more image of each authorized vehicle user. If the ECU 102 suspects that the vehicle 100 has been stolen then the ECU may compare image data from an interior of the vehicle cabin to the image data 322 determine if an unauthorized user has taken the vehicle (thus confirming whether the vehicle 100 is stolen).

The network access device 110 may at least one of transmit or receive various pieces of information. The network access device 110 may transmit a suspicious event notification 322 to a remote device (such as the remote device 144 of FIG. 1) associated with a vehicle user. For example, the suspicious event notification 322 may include a notification that harm has befallen a vehicle user and may be transmitted to at least one of a family member of the vehicle user or authorities. As another example, the suspicious event notification 322 may include a notification that the vehicle 100 has not been driven for a long period of time (during which the ECU 102 may have predicted that the vehicle 100 will be driven) and may be transmitted to a vehicle user.

The network access device 110 may further receive calendar data 324. The calendar data 324 may be received from the cloud, from a user device (such as the remote device 144 of FIG. 1), or the like. The calendar data 324 may include calendar data for a specific time, or may generally include all data included in the user calendar.

The network access device 110 may further receive a suspicious event user confirmation 326. The confirmation 326 may be received from a user device (such as the remote device 144 of FIG. 1) and may include a confirmation from a vehicle user regarding whether a suspicious event has occurred. For example, the ECU 102 may determine that the vehicle 100 has been stolen and may transmit a notification 322 to this effect to the user device. The user may receive the notification and may transmit a confirmation 326 to the vehicle 100 confirming or denying that the vehicle 100 is stolen. For example, if the user has let a friend borrow the vehicle 100 then the confirmation 326 may deny that the vehicle is stolen. On the other hand, if the user has not let anyone borrow the vehicle 100 then the confirmation 326 may confirm that the vehicle 100 is stolen.

The network access device 110 may further receive a vehicle activity request 328. The vehicle activity request 328 may be received from a user device. The vehicle activity request 328 may include a request for the ECU 102 to perform a specific action with respect to the vehicle 100. For example, if the suspicious event notification 322 indicates that the vehicle 100 has been parked in a parking lot for an amount of time that is approaching a maximum amount of time in the parking lot then the user may request (via the request 328) that the ECU 102 move the vehicle 100 to a different parking lot to avoid receiving a ticket. As another example, if the notification 322 indicates that the vehicle 100 has been stolen then the user may request that the ECU 102 prevent the vehicle 100 from being further driven. In such a situation, the ECU 102 may control the vehicle 100 to park in a safe location and then prevent the vehicle 100 from being moved any further.

Figure 4A:
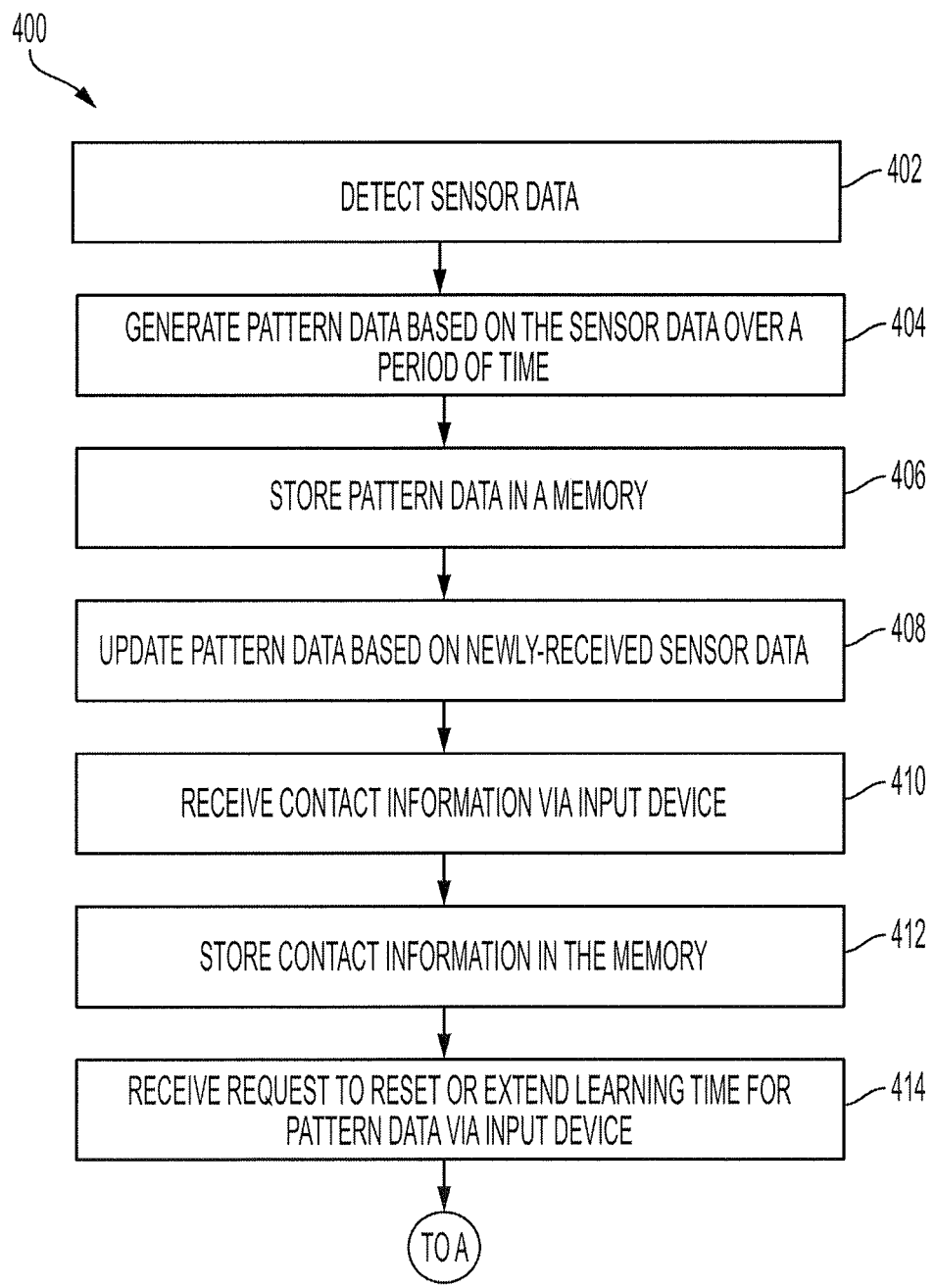
FIGS. 4A and 4B are flowcharts illustrating a method for identifying a suspicious event relating to a vehicle and taking an action in response to identifying such events according to an embodiment of the present invention.
Figure 4B:
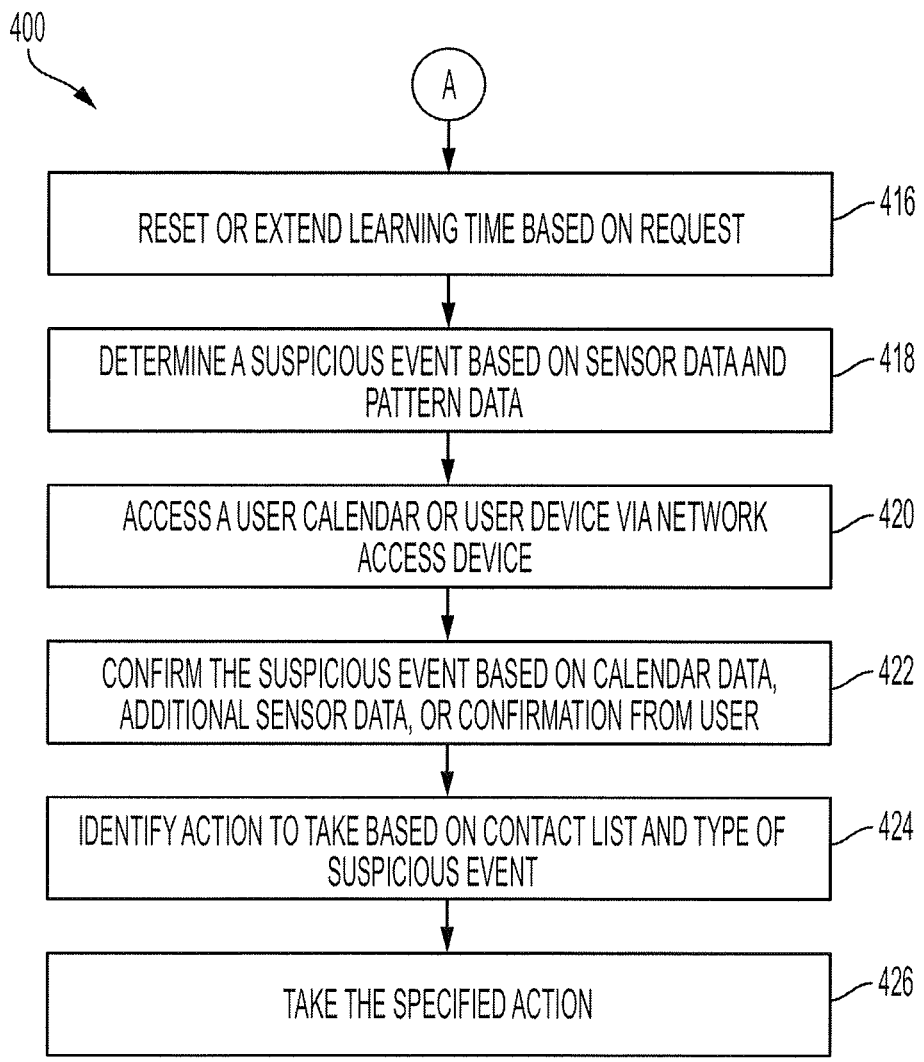

Referring now to FIGS. 4A and 4B, a method 400 for identifying a suspicious event relating to a vehicle, and for taking an action in response to identifying the suspicious event, is shown. The method 400 may be performed by a system similar to the system 101 of FIG. 1 and may be implemented in a vehicle similar to the vehicle 100 of FIG. 1.

In block 402, one or more sensor of a vehicle may detect sensor data (which corresponds to vehicle behavior or control and may thus be referred to as vehicle behavior data). The sensor data may include data from any sensor such as a location sensor, a camera, an accelerometer, a braking sensor, a turning sensor, a pressure sensor, a gear shift sensor, a light sensor, or the like. The sensor data may also or instead include control data relating to one or more control operation of a vehicle component. For example, the sensor data may include data corresponding to control of a steering wheel, a brake pedal, an acceleration pedal, a turn signal, a window operation device, a cruise control, or the like. The sensor data may also include data received from a network access device such as an identification of a mobile device in or around the vehicle, data received from such mobile device, or the like. The sensor data may relate to any operation, control of, function, or the like of the vehicle. For example, the sensor data may include whether the vehicle has been turned on or off, how a climate control is being used in the vehicle, whether the vehicle is being driven aggressively, an identification of one or more driver or passenger in the vehicle, or any other information relating to the vehicle.

In block 404, an ECU of the vehicle may receive the sensor data and may generate pattern data based on the received sensor data that was detected over a period of time. As mentioned above, the ECU may have a designated amount of time for which sensor data is received before the ECU generates the pattern data. For example, the designated amount of time may be two weeks, 10 hours of drive time, or the like. In some embodiments, the designated amount of time may change based on how long it takes the ECU to determine patterns. For example, if a driver takes the same routes and drives the same way every day then the ECU may generate pattern data after two weeks, while it may take three months to generate pattern data if the driver drives different routes and drives in different manners each day.

The pattern data may correspond to a baseline driving pattern of the driver. The pattern data may include information such as common routes, common departure times, common driving styles (including steering, braking, shifting, and acceleration), common passengers, or the like. The pattern data may further include common deviations from a general pattern which the driver exhibits. For example, the pattern data may include that the driver takes up to three new routes each week, that the driver takes one weekend trip each month, that the driver drives aggressively up to three times per month, or the like.

In block 406, the ECU may store the pattern data in a memory. The pattern data may be stored in a local memory on the vehicle, in a memory associated with the server, in the cloud, or the like. The pattern data may be transferable between vehicles so that a single set of pattern data may be shared between multiple vehicles owned or used by a single individual.

As more sensor data is received by the ECU, the ECU may update the pattern data in block 408. For example, if the driver begins driving in a different manner or begins traveling along different routes then the ECU may update the pattern data in the memory to reflect such changes. The ECU may distinguish between changes in the pattern data and suspicious events in a variety of manners. For example, the ECU may verify that the same individual is driving using image data, biometric identification, or the like and, if such verification is made, that changes in vehicle control correspond to changes in pattern data. Additionally, if a driving style gradually changes to a new driving style then the gradual change may be indicative of a change in pattern data and not a suspicious event. In some embodiments, the ECU may be programmed or otherwise learn how to distinguish between a change in pattern data and suspicious event.

In block 410, an input device of the vehicle may receive contact information. The contact information may include identifiers of one or more individual or organization, information usable to communicate with the one or more individual or organization, or the like. The contact information may further include an identifier of which individual or organization should be contacted for each type, or category, of suspicious event. For example, a user may provide input indicating that police are to be notified if the suspicious event includes vehicle theft, that a spouse is to be notified if the suspicious event indicates an illness or harm to the vehicle user, or the like.

In block 412, the ECU may store the contact information in the memory. The contact information may be stored in a local memory on the vehicle, a memory associated with the server, a cloud memory, or the like.

In block 414, an input device of the vehicle may receive a request to reset or extend a learning time for the pattern data. For example, a user may determine that he has driven the vehicle irregularly and wants to extend the learning time of block 404. In such a situation, the ECU may automatically extend the learning time by a predetermined amount, may select an amount of time by which to extend the learning time, or may receive an amount of time to extend the learning time from the user. As another example, a user may determine that he will be utilizing the vehicle in a different manner, whether due to traveling different routes (due to a new job or home location), due to learning new driving skills, or the like. The user may request the ECU to reset the pattern data in such a situation, and the ECU may erase the pattern data from the memory and began to relearn the pattern data.

In block 416, the ECU may reset or extend the learning time based on the request from block 414. In some embodiments, if the ECU is having difficulty determining the pattern data then the ECU may automatically reset or extend the learning time in block 416.

After generating and storing the pattern data, the ECU may continuously, periodically, or from time to time compare newly received sensor, or vehicle behavior, data to the pattern data. In block 418, the ECU may determine that a suspicious event has occurred when the vehicle behavior deviates from the pattern data by a threshold amount. The threshold amount may be preset into the ECU, may be defined by a user, may be determined using a machine learning algorithm, or the like. The threshold amount may correspond to a difference that is sufficiently great so as to indicate that a suspicious event has likely occurred.

The threshold amount may be measured in a variety of manners. For example, the threshold amount may correspond to a percentage deviation between all pattern data and all vehicle behavior data (such as a 25% total deviation). As another example, the threshold amount may correspond to a percentage deviation between a specific type of pattern data (e.g., historical routes taken by the vehicle) and corresponding vehicle behavior (e.g., new routes taken by the vehicle). In some embodiments, the threshold amount may have a different definition based on the type of vehicle behavior. For example, the threshold amount may be set to a 25% difference in aggressiveness of driving, three consecutive days of vehicle non-use, and addition of two unknown passengers for a vehicle trip. If the ECU determines that the vehicle behavior deviates from the pattern data by the threshold amount then the ECU may determine that a suspicious event has occurred.

In block 420, the ECU may access a user calendar stored on a user device or in the cloud. For example, the ECU may access the user calendar using a network access device of the vehicle.

In block 422, the ECU may confirm whether the suspicious event has occurred based on the calendar data, additional sensor data, or a confirmation from a user. In some embodiments, such information may be insufficient to confirm the suspicious event. In such situations, being unable to confirm or deny the suspicious event may be treated as confirmation of the suspicious event. However, in many situations, the ECU may be capable of confirming or denying suspicious event. For example, if the suspicious event includes that the vehicle has not been driven for five days then the ECU may confirm whether the calendar indicates that the vehicle owner has been on vacation. If so then the ECU may deny the suspicious event. However, if no trip is found on the calendar, then the ECU may confirm that the suspicious event has occurred.

As another example, the ECU may determine that a suspicious event has occurred (theft of the vehicle) when the vehicle is being driven in a different manner than recorded in the pattern data. In such situations, the ECU may compare image data detected by a camera in the vehicle cabin to historical image data to determine whether a current driver of the vehicle is the historical driver. If a match is made then the ECU may deny the suspicious event and, if no match is made, the ECU may confirm the suspicious event.

In some situations, the ECU may output a determination of a suspicious event using an output device of the vehicle (or may transmit the determination of the suspicious event to a mobile device associated with the user). The user may then be requested to provide feedback regarding confirmation of the suspicious event. If no feedback is provided then the ECU may take this as a confirmation of the suspicious event. Otherwise, the suspicious event may be confirmed or denied based on the feedback provided by the user.

In block 424, the ECU may identify one or more actions to take in response to identifying and confirming a suspicious event. The ECU may be preprogrammed to take certain actions in response to certain suspicious events. A user may add or change such actions using an input device of the vehicle. In some situations, the ECU may take a single action regardless of the type of suspicious event (e.g., notify a vehicle user of such event).

Examples of actions which may be taken by the ECU include contacting a device associated with authorities, the vehicle user, or associates of the vehicle user (including family members). Additional examples may include preventing further operation of the vehicle (e.g., preventing power from being transferred to the wheels or preventing the vehicle from being powered on, such as if the vehicle is suspected to be stolen). Another example may include the ECU maneuvering the vehicle to a different parking spot (e.g., if the suspicious event is that the vehicle has been left in a parking lot for a long period of time).

In block 426, the ECU may take the specified action. For example, the ECU may control various aspects of the vehicle (such as a steering control, the network access device, the power source, or the like) in order to take such actions. In some embodiments, the ECU may indicate which action it is planning to take and may wait to take such action until confirmation is received from an authorized vehicle user.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for monitoring suspicious activity of a vehicle, the system comprising:
   a memory configured to store pattern data corresponding to a historical pattern of behavior of the vehicle;
   a sensor configured to detect sensor data corresponding to a current vehicle behavior;
   a network access device configured to communicate with a remote device and to receive user calendar data from the remote device or from a second remote device, the user calendar data including at least one date or time; and
   an electronic control unit (ECU) coupled to the memory, the sensor, and the network access device and configured to:
   determine a suspicious event when the current vehicle behavior deviates from the historical pattern of behavior of the vehicle by a threshold amount and further based on the received user calendar data, and control the network access device to transmit a notification of the suspicious event to the remote device.

2. The system of claim 1 further comprising an input device configured to receive user input including contact information for the remote device, wherein the memory is further configured to store the contact information and the ECU is further configured to control the network access device to transmit the notification based on the stored contact information.

3. The system of claim 1 wherein the ECU is further configured to generate the pattern data based on the detected sensor data over a first period of time, to update the pattern data based on the detected sensor data over a second and later period of time, and to control the memory to store the pattern data.

4. The system of claim 3 further comprising an input device configured to receive user input corresponding to a request to reset or extend a learning time for the pattern data, and the ECU is further configured to at least one of reset or extend the learning time for the pattern data based on the user input.

5. The system of claim 1 wherein the memory is further configured to store a contact list including a list of suspicious event types and a main contact for each event type in the list of suspicious event types, the main contact including contact information, wherein the ECU is further configured to identify a type of the suspicious event by comparing the suspicious event to the list of suspicious event types and to control the network access device to contact the main contact for the type of the suspicious event.

6. The system of claim 1 further comprising a camera separate from the sensor and configured to detect image data corresponding to an environment at least one of inside a vehicle cabin or outside of the vehicle cabin, wherein the ECU is further configured to confirm the suspicious event by comparing the image data to previously-detected image data prior to controlling the network access device to transmit the notification of the suspicious activity to the remote device.

7. The system of claim 1 further comprising a power source configured to generate power to propel the vehicle, wherein the ECU is further configured to at least one of prevent the power source from turning on or prevent the power source from propelling the vehicle when the suspicious event is determined.

8. The system of claim 1 further comprising a power source configured to generate power to propel the vehicle, wherein the suspicious event is non-use of the vehicle for a predetermined period of time, and the ECU is further configured to at least one of turn on the power source or turn on the power source and maneuver the vehicle to a new location when the suspicious event is determined.

9. The system of claim 1 wherein the sensor includes at least one of a location sensor configured to detect at least one of a location or movement of the vehicle, a camera configured to detect image data at least one of in a vehicle cabin or outside of the vehicle cabin; an acceleration sensor configured to detect at least one of an acceleration, a deceleration, an acceleration request, or a deceleration request of the vehicle; a braking sensor configured to detect at least one of a braking event or a braking request of the vehicle; a turning sensor configured to detect at least one of a turn or a turn request of the vehicle; a passenger sensor configured to detect at least one of a presence of passengers or an identity of the passengers in the vehicle cabin; a shift sensor configured to detect gear shifting of the vehicle; a blinker configured to detect turn indicator requests of the vehicle; a power source sensor configured to detect a state of a power source of the vehicle; or the network access device configured to identify nearby remote devices in the cabin of the vehicle.

10. A system for monitoring suspicious activity of a vehicle, the system comprising:
    a power source configured to generate power to propel the vehicle;
    a memory configured to store pattern data corresponding to a historical pattern of behavior of the vehicle;
    a sensor configured to detect sensor data corresponding to a current vehicle behavior;
    a network access device configured to communicate with a remote device; and
    an electronic control unit (ECU) coupled to the memory, the sensor, and the network access device and configured to:
        generate the pattern data based on the detected sensor data over a period of time,
        determine a suspicious event corresponding to non-use of the vehicle for a predetermined period of time when the current vehicle behavior deviates from the historical pattern of behavior of the vehicle by a threshold amount,
        control the network access device to transmit a notification of the suspicious event to the remote device; and
        at least one of turn on the power source or turn on the power source and maneuver the vehicle to a new location when the suspicious event is determined.

11. The system of claim 10 further comprising an input device configured to receive user input including contact information for the remote device, wherein the memory is further configured to store the contact information and the ECU is further configured to control the network access device to transmit the notification based on the stored contact information.

12. The system of claim 10 further comprising an input device configured to receive user input corresponding to a request to reset or extend a learning time for the pattern data, and the ECU is further configured to at least one of reset or extend the learning time for the pattern data based on the user input.

13. The system of claim 10 wherein:
    the network access device is further configured to receive user calendar data from the remote device or from a second remote device, the user calendar data including at least one date or time; and
    the ECU is further configured to determine the suspicious event based on the received user calendar.

14. The system of claim 10 wherein the memory is further configured to store a contact list including a list of suspicious event types and a main contact for each event type in the list of suspicious event types, the main contact including contact information, wherein the ECU is further configured to identify a type of the suspicious event by comparing the suspicious event to the list of suspicious event types and to control the network access device to contact the main contact for the type of the suspicious event.

15. The system of claim 10 further comprising a camera separate from the sensor and configured to detect image data corresponding to an environment at least one of inside a vehicle cabin or outside of the vehicle cabin, wherein the ECU is further configured to confirm the suspicious event by comparing the image data to previously-detected image data prior to controlling the network access device to transmit the notification of the suspicious activity to the remote device.

16. A method for monitoring suspicious activity of a vehicle, the method comprising:
- storing, in a memory, pattern data corresponding to a historical pattern of behavior of the vehicle;
- detecting, by a sensor, sensor data corresponding to a current vehicle behavior;
- receiving, by a network access device, user calendar data for at least one date or time from a remote device;
- determining, by an electronic control unit (ECU), a suspicious event when the current vehicle behavior deviates from the historical pattern of behavior of the vehicle by a threshold amount and further based on the received user calendar data; and
- controlling, by the ECU, a network access device to transmit a notification of the suspicious event to the remote device or a second remote device.

17. The method of claim 16 further comprising:
- generating, by the ECU, the pattern data based on the detected sensor data over a first period of time;
- updating, by the ECU, the pattern data based on the detected sensor data over a second, later period of time; and
- controlling, by the ECU, the memory to store the pattern data.

18. The method of claim 17 further comprising:
- receiving, by an input device, user input corresponding to a request to reset or extend a learning time for the pattern data; and
- at least one of resetting or extending, by the ECU, the learning time for the pattern data based on the user input.

* * * * *